(12) United States Patent
Kovvali et al.

(10) Patent No.: US 10,733,276 B2
(45) Date of Patent: Aug. 4, 2020

(54) MULTI-MICROPHONE HUMAN TALKER DETECTION

(71) Applicant: Cirrus Logic International Semiconductor Ltd., Edinburgh (GB)

(72) Inventors: Narayan Kovvali, Tempe, AZ (US); Ying Li, Chandler, AZ (US); Nima Yousefian Jazi, Tempe, AZ (US); Seth Suppappola, Tempe, AZ (US)

(73) Assignee: Cirrus Logic International Semiconductor Ltd., Edinburgh (GB)

( * ) Notice: Subject to any disclaimer, the term of this patent is extended or adjusted under 35 U.S.C. 154(b) by 210 days.

(21) Appl. No.: 15/836,677

(22) Filed: Dec. 8, 2017

(65) Prior Publication Data
US 2019/0180014 A1    Jun. 13, 2019

(51) Int. Cl.
*G06F 21/32* (2013.01)
*G10L 17/00* (2013.01)
(Continued)

(52) U.S. Cl.
CPC .............. *G06F 21/32* (2013.01); *G01S 3/80* (2013.01); *G10L 17/00* (2013.01); *G10L 17/005* (2013.01);
(Continued)

(58) Field of Classification Search
CPC ........... G06F 21/32; H04R 1/406; G10L 7/26; G10L 21/028; G10L 17/00; G10L 17/005; G10L 25/51; G01S 3/80
See application file for complete search history.

(56) References Cited

U.S. PATENT DOCUMENTS 9,852,745 B1 * 12/2017 Tootill .................... G10L 25/18
9,892,732 B1 *  2/2018 Tian ........................ G01S 3/80
(Continued)

FOREIGN PATENT DOCUMENTS

GB      2541466 A      2/2017
WO   2017129239 A1   8/2017

OTHER PUBLICATIONS

Reynolds, et al. "Overview of Automatic Speaker Recognition," JHU 2008 Workshop Summer School.
(Continued)

*Primary Examiner* — Mohammad A Siddiqi
(74) *Attorney, Agent, or Firm* — Norton Rose Fulbright US LLP (57) ABSTRACT

The reliable differentiation of human and artificial talkers is important for many automatic speaker verification applications, such as in developing anti-spoofing countermeasures against replay attacks for voice biometric authentication. A multi-microphone approach may exploit small movements of human talkers to differentiate between a human talker and an artificial talker. One method of determining the presence or absence of talker movement includes monitoring the variation of the inter-mic frequency-dependent phase profile of the received microphone array data over a period of time. Using spatial information with spectral-based techniques for determining whether an audio source is a human or artificial talker may reduce the likelihood of success of spoofing attacks against a voice biometric authentication system. The anti-spoofing countermeasure may be used in electronic devices including smart home devices, cellular phones, tablets, and personal computers.

22 Claims, 8 Drawing Sheets

(51) Int. Cl.
*H04R 1/40* (2006.01)
*G10L 17/26* (2013.01)
*G01S 3/80* (2006.01)
G10L 25/51 (2013.01)
G10L 21/0216 (2013.01)

(52) U.S. Cl.
CPC .............. *G10L 17/26* (2013.01); *H04R 1/406* (2013.01); *G10L 25/51* (2013.01); *G10L 2021/02166* (2013.01)

(56) References Cited

U.S. PATENT DOCUMENTS

| | | | | |
|---|---|---|---|---|
| 2009/0259468 A1* | 10/2009 | Schroeter | ................ | G10L 17/20 704/246 |
| 2011/0131044 A1* | 6/2011 | Fukuda | ................... | G10L 15/20 704/246 |
| 2013/0225128 A1* | 8/2013 | Gomar | ................... | H04W 12/06 455/411 |
| 2014/0219471 A1* | 8/2014 | Deshpande | ............ | H04R 3/005 381/92 |
| 2018/0047394 A1* | 2/2018 | Tian | ........................ | G10L 15/24 |
| 2018/0053114 A1* | 2/2018 | Adjaoute | ............... | G06N 7/005 |
| 2018/0232511 A1* | 8/2018 | Bakish | .................. | H04L 9/3231 |
| 2019/0096408 A1* | 3/2019 | Li | ............................ | G01S 5/18 |

OTHER PUBLICATIONS

Campbell, "Speaker Recognition: A Tutorial," Proceedings of the IEEE, vol. 85(9), pp. 1437-1462 (Sep. 1997).
Zhang, et al., "VoiceLive: A Phoneme Localization based Liveness Detection for Voice Authentication on Smartphones," Proceedings of the 2016 ACM SIGSAC Conference on Computer and Communications Security, pp. 1080-1091 (Oct. 24, 2016).
Evans, et al., "Spoofing and countermeasures for speaker verification: A survey," Speech Communication (Nov. 2014).
Shang et al., "Defending Against Voice Spoofing: A Robust & Software-Based Liveness Detection System" 2018 IEEE 15th International Conference on Mobile Ad Hoc and Sensor Systems, (MASS) Sep. 10, 2019.
Combined Search and Examination Report dated May 14, 2019, during prosecution of related GB Appl. No. 1818705.4.

* cited by examiner

MULTI-MICROPHONE HUMAN TALKER DETECTION

CROSS-REFERENCE TO RELATED PATENT APPLICATIONS

This application is related by subject matter to U.S. patent application Ser. No. 15/714,190 entitled "Persistent Interference Detection" and filed on Sep. 25, 2017, U.S. patent application Ser. No. 15/714,262 entitled "Temporal and Spatial Detection of Acoustic Sources" and filed on Sep. 25, 2017, U.S. patent application Ser. No. 15/714,296 entitled "Talker Change Detection" and filed on Sep. 25, 2017, and U.S. patent application Ser. No. 15/714,356 entitled "Spatial Clues from Broadside Detection" and filed on Sep. 25, 2017.

FIELD OF THE DISCLOSURE

The instant disclosure relates to audio processing. More specifically, portions of this disclosure relate to voice biometric authentication.

BACKGROUND

Figure 1:
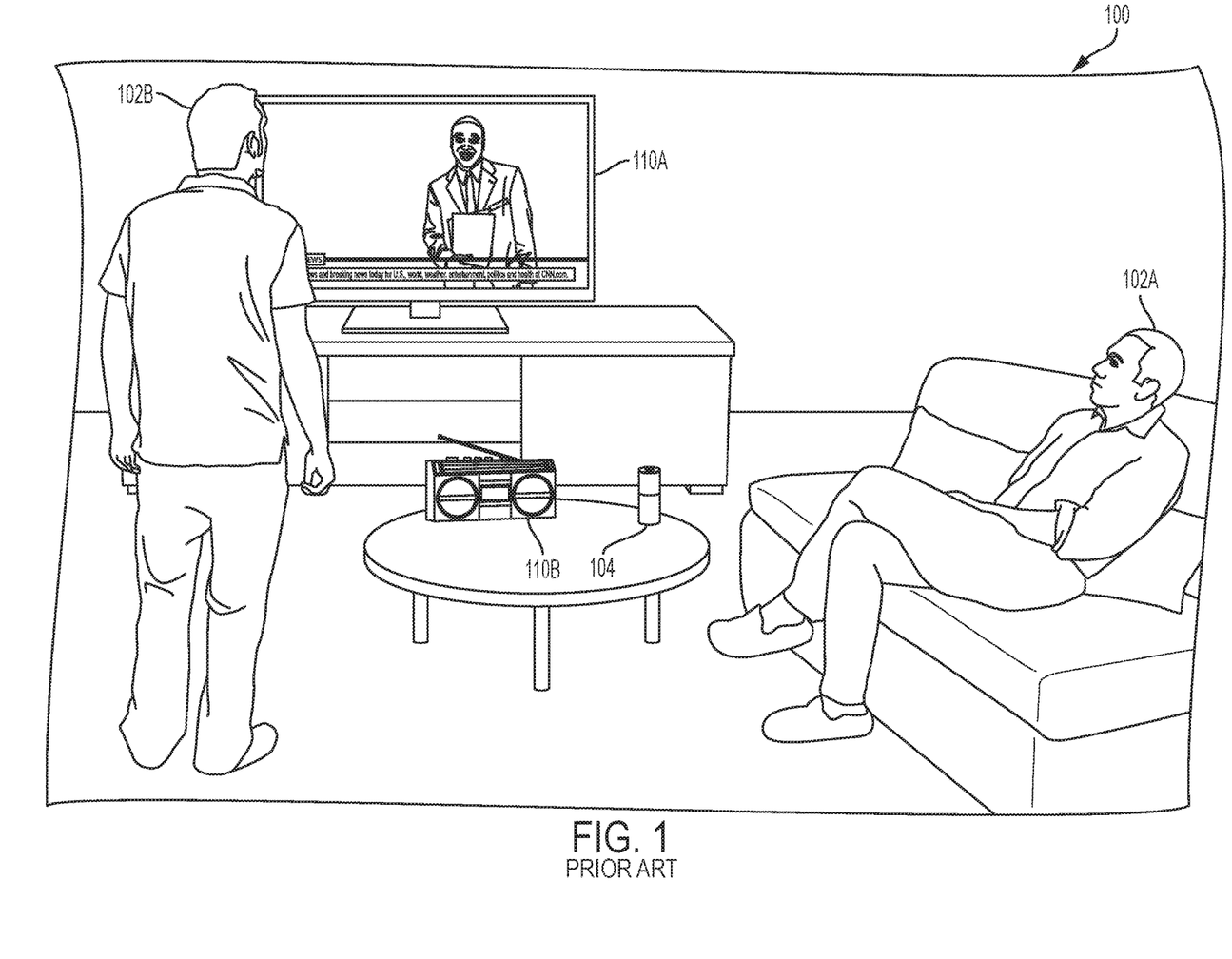
FIG. 1 is an illustration of a conventional smart home device in a room.

In many automatic speaker verification applications, e.g., voice biometric authentication, in order to protect against malicious spoofing attacks, there is need for reliable differentiation of speech from a human talker and that from an artificial talker. An example of this is in voice biometric authentication for smart home applications. A smart home device is an electronic device configured to receive user speech input, process the speech input, and take an action based on the speech input. FIG. 1 shows a smart home device in a room. A living room 100 may include a smart home device 104. The smart home device 104 may include a microphone or an array of microphones, a speaker, and electronic components for receiving speech input. Individuals 102A and 102B may be in the room and communicating with each other or speaking to the smart home device 104. Individuals 102A and 102B may be moving around the room, moving their heads, putting their hands over their face, or taking other actions that change how the smart home device 104 receives their voices. In this scenario, voice biometric authentication may be used to identify a speaker interacting with the smart home device and provide some security.

However, conventional voice biometric authentication is susceptible to spoofing attacks. In a spoofing attack, an unauthorized user attempts to impersonate an authorized user to gain access to the user's account. Spoofing with a smart home device may include the unauthorized user playing back recorded speech of the authorized user from a playback device such as a mobile phone. Such a recording could be easily obtained when that unauthorized user is in the room 100 with the authorized user who passed the voice authentication by speaking to the device 104, as shown in FIG. 1. After the authorized user leaves, the unauthorized user may play back the recorded voice commands. The unauthorized user may also send the voice recordings to other unauthorized users, who then spoof the authorized user on any similar smart home devices.

Conventional automatic speaker verification systems rely on spectral features such as mel-frequency cepstral coefficients (MFCCs), linear predictive cepstral coefficients (LPCCs), perceptual linear prediction (PLP), and i-vectors, that are usually modeled using Gaussian mixture models (GMMs) and then classified. Conventional single-microphone anti-spoofing methods attempt to detect differences in MFCCs, pitch, relative phase shift, spectral modulation, and channel pattern noise between the real and synthetic speech. Some methods make use of cut-and-paste detection and repeated sample detection to differentiate authentic speech from playback. However, automatic speaker verification systems are still susceptible to spoofing attacks. In particular, conventional single-microphone authentication methods rely on spectral information alone and are vulnerable to replay attacks, in which a high-quality loudspeaker is used to play a recording of the desired talker and gain unauthorized access.

Shortcomings mentioned here are only representative and are included simply to highlight that a need exists for improved electrical components, particularly for audio processing and user authentication employed in consumer-level devices. Embodiments described herein address certain shortcomings but not necessarily each and every one described here or known in the art. Furthermore, embodiments described herein may present other benefits than, and be used in other applications than, those of the shortcomings described above. For example, similar shortcomings may be encountered in other audio devices, such as mobile phones, and embodiments described herein may be used in mobile phones to solve such similar shortcomings as well as other shortcomings.

SUMMARY

Audio processing may be improved with new techniques for processing microphone signals received by an electronic device. Two or more microphones may be used to record sounds from the environment, and the recorded sounds processed to obtain information regarding the audio sources in the environment. For example, audio signals from two or more microphones may be processed to identify a type of audio source, whether a human source or artificial source. An audio source identified as artificial can be excluded from speech recognition processing to prevent unauthorized users from succeeding in a replay spoofing attack on a smart home device. In some embodiments, the audio source may also be characterized as noise source or talker source to prevent accidental triggering of commands from human speakers on a noise source. The identification of the noise sources may also be used to filter the identified noise sources from the microphone signals to improve the recognition of desired speech.

Differentiation of a human talker from an artificial talker (e.g., a loudspeaker) may be performed on a speaker- and text-independent basis using spatial information obtained from a microphone array, based on the observation that a real human talker moves with respect to the microphone array while speaking whereas an artificial talker such as a loudspeaker does not move with respect to the microphone array. Movement may include small movements of the human talker's body (e.g., slight head rotation/tilting, mouth, torso, or limb movement) while speaking, in addition to large position changes such as moving around the room. To detect the relative movement between the human talker and the device, the proposed multi-microphone anti-spoofing method uses the inter-microphone frequency-dependent phase profile of the received microphone array data. Specifically, the inter-microphone frequency-dependent phase profile depends on the sound propagation from a source to the microphone array (acoustic path), and varies whenever there is a change in the source location with respect to the array and remains invariant otherwise. Even a small talker movement, such as the slight head rotation as described above, can affect the inter-microphone phase significantly. Thus, by monitoring the amount of variation of the inter-microphone frequency-dependent phase profile over a period of time, an artificial sound source such as a loudspeaker can be discriminated from a human talker. The use of the inter-microphone frequency-dependent phase profile, instead of simple direction of arrival (DOA), allows the audio processing to be robust and generally applicable to real reverberant environments (reverberation in a room environment can degrade the performance of DOA estimation dramatically). In some embodiments, information regarding spatial stationarity of audio sources obtained by processing the inter-microphone frequency-dependent phase profile is combined with other authentication techniques to improve the reliability of automatic speaker verification systems.

Electronic devices incorporating functions for automatic speech verification and recognition, audio processing, audio playback, smart home automation, and other functions may benefit from the audio processing described herein. The algorithms performing the audio processing may be integrated in hardware components of the electronic devices or programmed as software or firmware to execute on the hardware components of the electronic device. The hardware components may include processors or other components with logic units configured to execute instructions. The programming of instructions to be executed by the processor can be accomplished in various manners known to those of ordinary skill in the art. Additionally or alternatively to integrated circuits comprising logic units, the integrated circuits may be configured to perform the described audio processing through discrete components, such as transistors, resistors, capacitors, and inductors. Such discrete components may be configured in various arrangements to perform the functions described herein. The arrangement of discrete components to perform these functions can be accomplished by those of ordinary skill in the art. Furthermore, discrete components can be combined with programmable components to perform the audio processing. For example, an analog-to-digital converter (ADC) may be coupled to a digital signal processor (DSP), in which the ADC performs some audio processing and the DSP performs some audio processing. The ADC may be used to convert an analog signal, such as a microphone signal, to a digital representation of sounds in a room. The DSP may receive the digital signal output from the ADC and perform mathematical operations on the digital representation to identify and/or extract certain sounds in the room. Such a circuit including analog domain components and digital domain components may be referred to as a mixed signal circuit, wherein "mixed" refers to the mixing of analog and digital processing.

In some embodiments, the mixed signal circuit may be integrated as a single integrated circuit (IC). The IC may be referred to as an audio controller or audio processing because the IC is configured to process audio signals as described herein and is configured to provide additional functionality relating to audio processing. However, an audio controller or audio processor is not necessarily a mixed signal circuit, and may include only analog domain components or only digital domain components. For example, a digital microphone may be used such that the input to the audio controller is a digital representation of sounds and analog domain components are not included in the audio controller. In this configuration, and others, the integrated circuit may have only digital domain components. One example of such a configuration is an audio controller having a digital signal processor (DSP). Regardless of the configuration for processing audio, the integrated circuit may include other components to provide supporting functionality. For example, the audio controller may include filters, amplifiers, equalizers, analog-to-digital converters (ADCs), digital-to-analog converters (DACs), a central processing unit, a graphics processing unit, a radio module for wireless communications, and/or a beamformer. The audio may be used in electronic devices with audio outputs, such as music players, CD players, DVD players, Blu-ray players, headphones, portable speakers, headsets, mobile phones, tablet computers, personal computers, set-top boxes, digital video recorder (DVR) boxes, home theatre receivers, infotainment systems, automobile audio systems, and the like.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Audio processing may use microphone signals from two or more microphones of an electronic device. An electronic device, such as a smart home device 200 shown in FIG. 2, may include a microphone array 202 including microphones 202A-G. The microphones 202A-G may be any microphone device that transduces pressure changes (such as created by sounds) into an electronic signal. One example device is a miniature microphone, such as a micro-electro-mechanical system (MEMS) microphone. Another example is a digital microphone (DMIC). The microphones 202A-G may be arranged in various configurations on the smart home device 200. The different positions result in each of the microphones 202A-G receiving different audio signals at any moment in time. Despite the difference, the audio signals are related as corresponding to the same environment and the same sound sources in the environment. The similarity and the difference of the audio signals may be used to infer characteristics of the environment and/or the sound sources in the environment.

Figure 2:
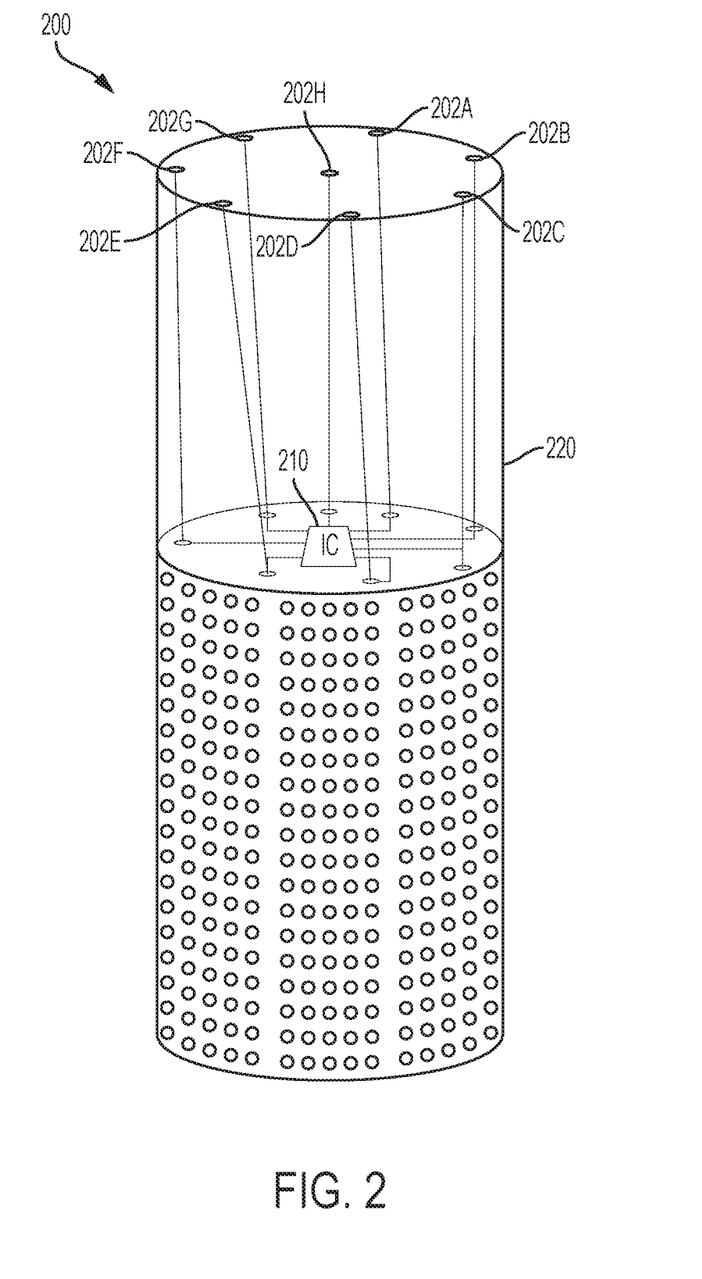
FIG. 2 is a perspective view of a smart home device with components used for audio processing according to some embodiments of the disclosure.

An integrated circuit (IC) 210 may be coupled to the microphones 202A-G and used to process the signals produced by the microphones 202A-G. The IC 210 performs functions of the audio processing of the invention, such as described in the embodiment of FIG. 8 or other near-field or far-field applications. The output of the IC 210 may vary in different embodiments based on a desired application. In smart home device 200, the IC 210 may determine a binary decision or confidence metric about human/artificial talker detection by processing a digital representation of audio received through the microphones 202A-G according to embodiments of the invention. After a determination has been made about whether the talker is human or artificial, additional processing may be performed on the audio signal. For example, processing of the microphone signals may result in a voice-authenticated output audio signal that can be further processed such as to improve sound quality or to recognize voice commands. Although example embodiments are described for a stationary smart home device in a living room, the processing described herein may be applied to any electronic devices with multiple microphones including, for example, cellular phones, tablets, and personal computers.

The microphones 202A-H are illustrated as integrated in a single electronic device in example embodiments of the invention. However, the microphones may be distributed among several electronic devices. For example, in some embodiments, the microphones 202A-H may be in multiple devices at different locations in a living room. Those devices may wirelessly communicate with the smart home device 200 through a radio module in the devices and the smart home device 200. Such a radio module may be a RF device operating in the unlicensed spectrum, such as a 900 MHz RF radio, a 2.4 GHz or 5.0 GHz WiFi radio, a Bluetooth radio, or other radio modules.

Figure 3:
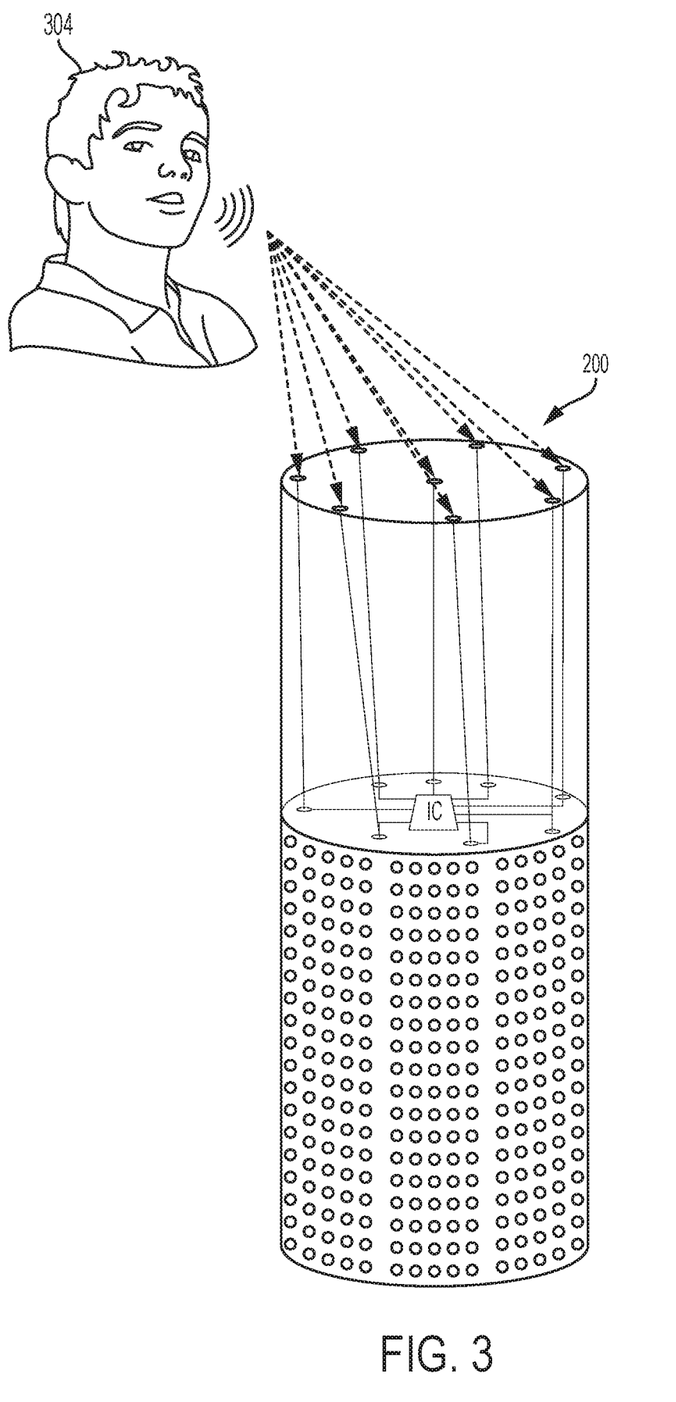
FIG. 3 is an illustration of different times of arrival of audio at two or more microphones according to some embodiments of the disclosure.
Figure 4A:
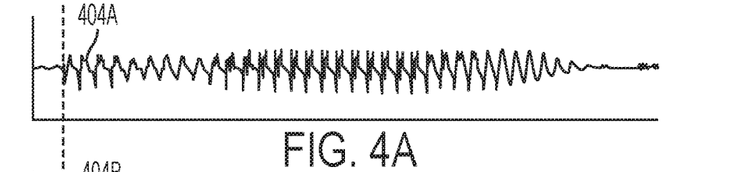
FIGS. 4A-I are graphs illustrating microphone signals from an array of microphones at different locations on an electronic device according to some embodiments of the disclosure.
Figure 4B:
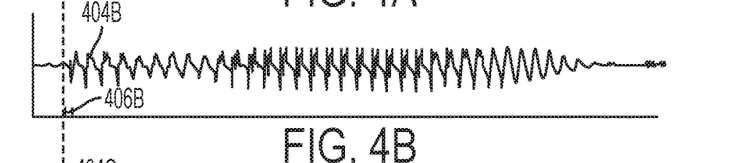
Figure 4C:
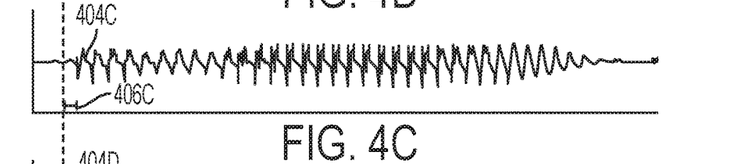
Figure 4D:
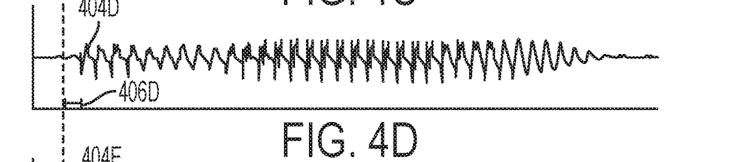
Figure 4E:
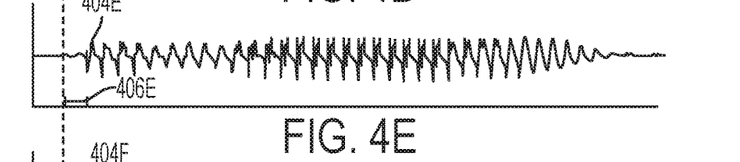
Figure 4F:
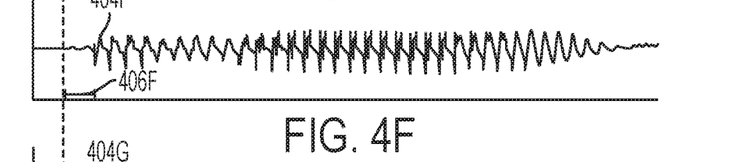
Figure 4G:
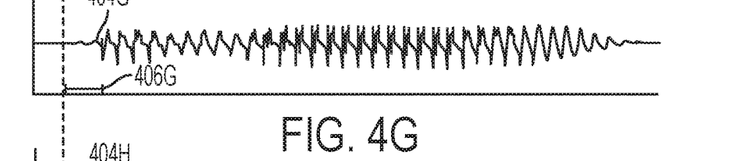
Figures 4H, 4I:
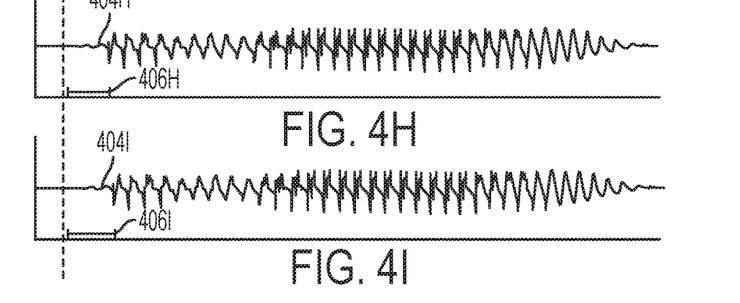

Microphones sense sound pressure changes in an environment over time. The different sound propagation times from a talker to the microphones on the smart device are illustrated in FIG. 3. A talker 304 may speak towards the microphones 202A-H of FIG. 2. The distance from the mouth of talker 304 to each of the microphones 202A-H is different, resulting in each of the microphones 202A-H receiving sound with a different time delay. More generally, the acoustic paths from the mouth of talker 304 to the microphones 202A-H include both the direct propagation paths and reflections, and these acoustic paths govern the overall sound propagation times from the talker to each of the microphones.

FIGS. 4A-I are graphs illustrating microphone signals from microphones at different positions on an electronic device, which may be used in some embodiments of the disclosure. A sound in an environment creates a pressure wave that spreads throughout the environment and decays as the wave travels. Each of the microphones 202A-H records the signal at a different time as the sound travels through the environment and reaches each of the microphones 202A-H. The closest microphone, which may be microphone 202A, records signal 404A. Other microphones receive the sound at a slightly later time as shown in signals 404B-I based the microphone's distance from the source, illustrated by the delays 406B-I. In general, the acoustic path of the sound arriving at each of the microphones includes both a direct propagation path and reflections, and the microphone recordings are a superposition of the direct propagation and reflections of the sound. As a result, the signals recorded by the different microphones may not be simply time-delayed with respect to each other.

Each of the signals 404A-H recorded by microphones 202A-H may be processed by IC 210. IC 210 may filter the signals and calculate signal characteristics, such as phase, between each of the pairs of microphones. For example, an inter-microphone frequency-dependent phase profile may be calculated between the signals 404A and 404B corresponding to microphones 202A and 202B, respectively. The phase profile is proportional to the timing difference between the signals 404A and 404B, as governed by the full sound propagation from a source to the microphones (including the direct path, room reverberation, and diffraction effects) and uniquely captures the acoustic path from the source to that microphone pair in the room. A change in the source location results in a change in the phase profile. The inter-microphone frequency-dependent phase profile may be calculated for other pairs of microphones. The phase information may be used in audio processing to detect whether an audio source is a human talker or an artificial talker (such as a loudspeaker in a spoofing attack) for voice biometric authentication.

Figure 5:
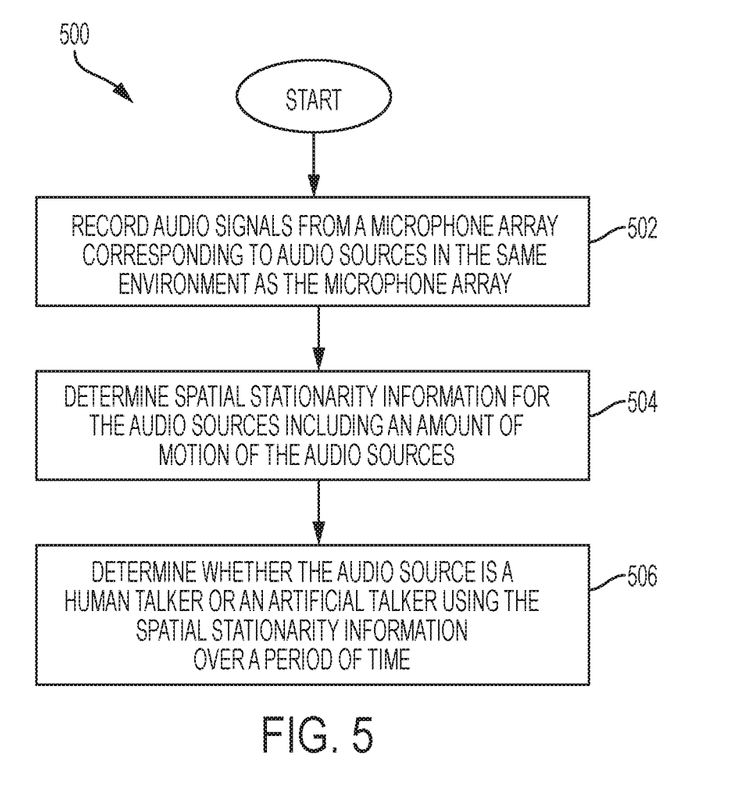
FIG. 5 is a flow chart illustrating an example method for determining whether an audio source is a human or artificial talker according to some embodiments of the disclosure.

FIG. 5 is a flow chart illustrating an example method for determining whether an audio source is a human or artificial talker according to some embodiments of the disclosure. A method 500 begins at block 502 with recording audio signals from a microphone array on a device. The audio signals contain representations of sounds generated by audio sources in the same environment as the microphone array. For example, if the microphone array is part of a smart home device, then the audio signals include sounds from human talkers in the room with the smart home device. The audio signals may also include sounds from artificial talkers, such as loudspeakers. The audio signals may further include sounds from noise sources, such as televisions, radios, and home appliances. Movement of the audio sources relative to the microphone array may be used to determine if the audio sources are human talkers or artificial talkers. At block 504, spatial stationarity information is determined for the audio sources in the recorded audio signals, such as an amount of motion of the audio sources representative of movements of the head and/or body of a talker. In some embodiments, the spatial stationarity information is contained in the amount of variation of an inter-microphone frequency-dependent phase profile for one or more pairs of microphones in the microphone array over a period of time. At block 506, the audio source is classified as either a human talker or an artificial talker using the spatial stationarity information. For example, if motion is identified in the spatial information for the audio source then the audio source is identified as a human talker.

Figure 6:
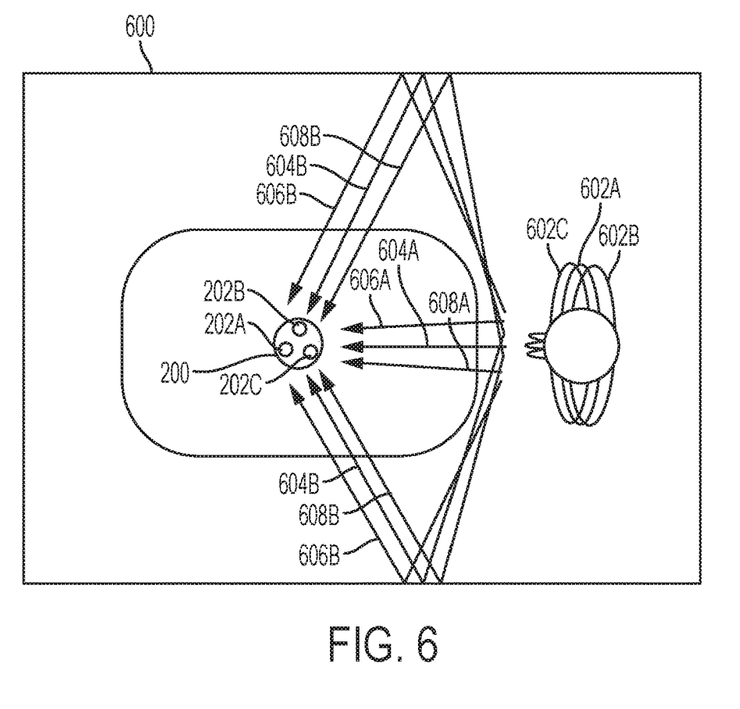
FIG. 6 is an illustration of acoustic paths from a human talker to the microphone array according to some embodiments of the disclosure.
Figure 7:
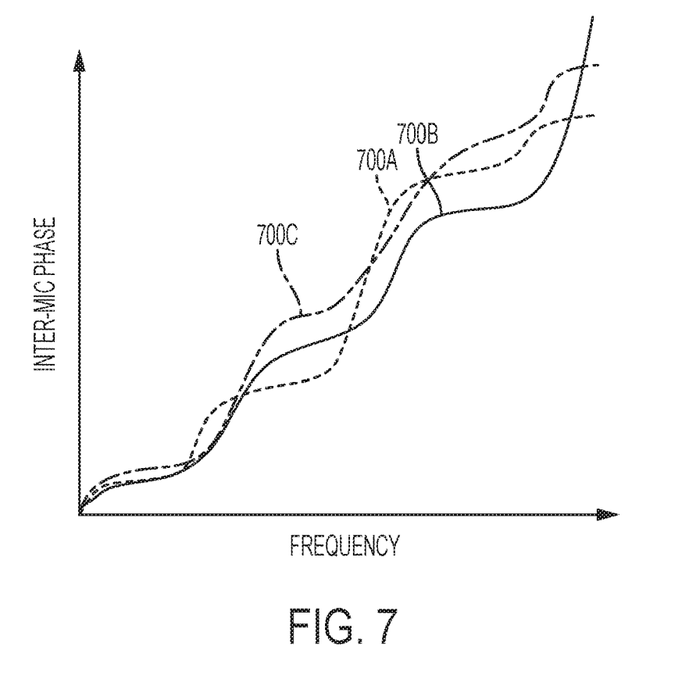
FIG. 7 is a graph illustrating an example inter-microphone frequency-dependent phase profile at different time instants for a human talker according to some embodiments of the disclosure.

The contrast between spatial stationarity information for a human talker and an artificial talker is illustrated in FIG. 6, FIG. 7, FIG. 8, and FIG. 9. The case of a human talker is shown in FIG. 6 and FIG. 7. FIG. 6 is an illustration of acoustic paths from a human talker to the microphone array on a device according to some embodiments of the disclosure. A human talker 602 while speaking moves naturally from position 602A to 602B and to 602C. Direct and reflected sounds are received by smart home device 200. While the talker 602 is in position 602A, the direct component of sound reaches the device 200 by path 604A and reflected sounds reach the device 200 by paths 604B. While the talker 602 is in position 602B, the direct component of sound reaches the device 200 by path 606A and reflected sounds reach the device 200 by paths 606B. While the talker 602 is in position 602C, the direct component of sound reaches the device 200 by path 608 and reflected sounds reach the device 200 by paths 608B. Sounds along each of the paths reach the microphones 202A-C with various time delays. FIG. 7 is a graph illustrating example inter-microphone phase profiles recorded for a human talker according to some embodiments of the disclosure. Graphs 700A, 700B, and 700C illustrate inter-microphone phase as a function of frequency, for audio signals recorded by device 200 with human talker 602 in positions 602A, 602B, and 602C, respectively. The small changes in spatial position of the human talker while speaking result in a change in the inter-microphone frequency-dependent phase profile for pairs of the microphones 202A-C between multiple time instants. A significant amount of variation in the inter-microphone frequency-dependent phase profile for audio signals recorded by the microphones 202A-C over a period of time can be used to infer that the talker exhibits movement over a period of time and may be a human talker.

Figure 8:
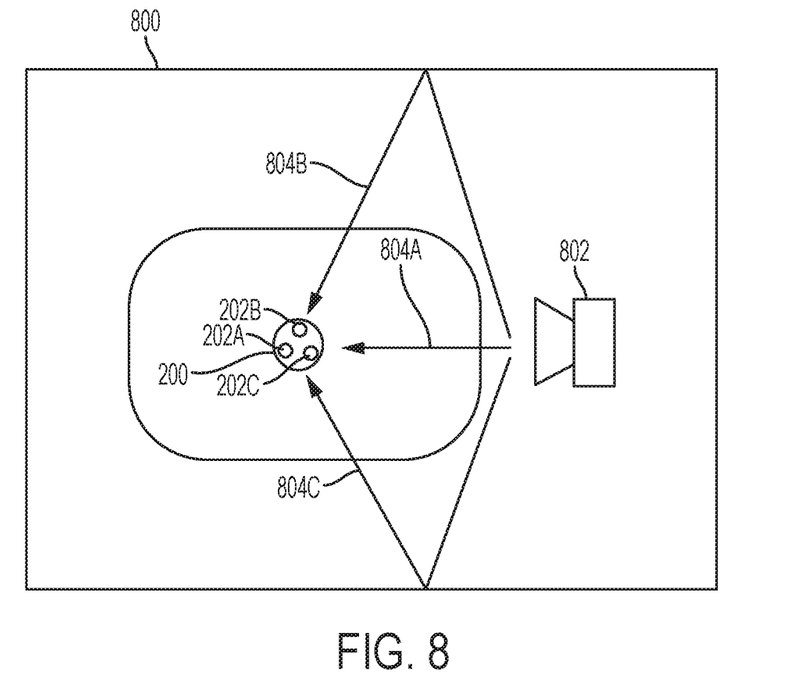
FIG. 8 is an illustration of acoustic paths from an artificial talker to the microphone array according to some embodiments of the disclosure.
Figure 9:
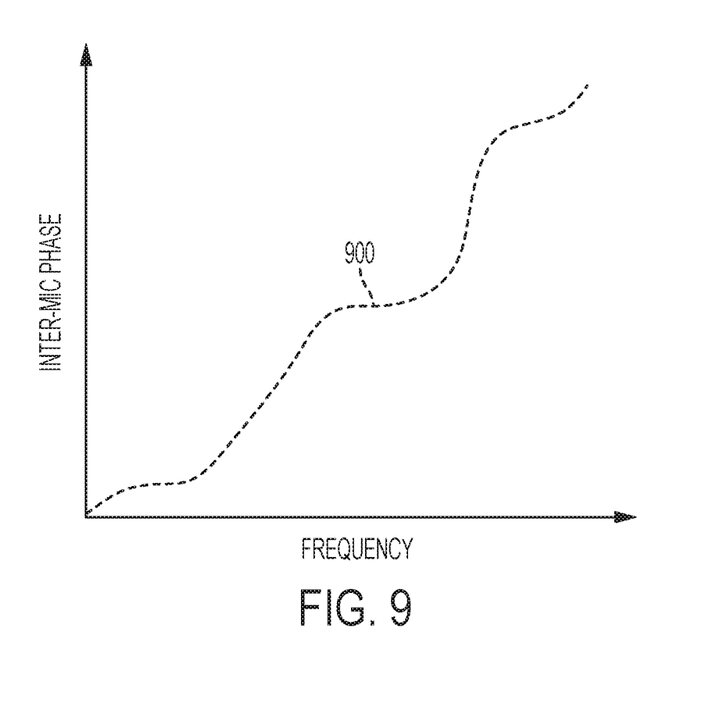
FIG. 9 is a graph illustrating an example inter-microphone frequency-dependent phase profile at different time instants for an artificial talker according to some embodiments of the disclosure.

Spatial stationarity information can likewise reflect when an audio source is an artificial talker. The case of an artificial talker is shown in FIG. 8 and FIG. 9. FIG. 8 is an illustration of the acoustic path from an artificial talker to the microphone array on a device according to some embodiments of the disclosure. An artificial talker 802, such as a loudspeaker, has a fixed spatial location. Sound from the loudspeaker 802 reaches smart home device 202 along direct path 804A and reflected paths 804B and 804C. FIG. 9 is a graph illustrating an example inter-microphone phase profile recorded for an artificial talker according to some embodiments of the disclosure. Graph 900 illustrates the inter-microphone phase as a function of frequency, for audio signals recorded by device 200 with the artificial talker 802 in a fixed spatial location. The fixed spatial location of the loudspeaker results in no change in the inter-microphone frequency-dependent phase profile for pairs of the microphones 202A-C between multiple time instants. An insignificant amount of variation in the inter-microphone frequency-dependent phase profile for audio signals recorded by the microphones 202A-C over a period of time can be used to infer that the talker exhibits no movement over a period of time and may be an artificial talker.

Figure 10:
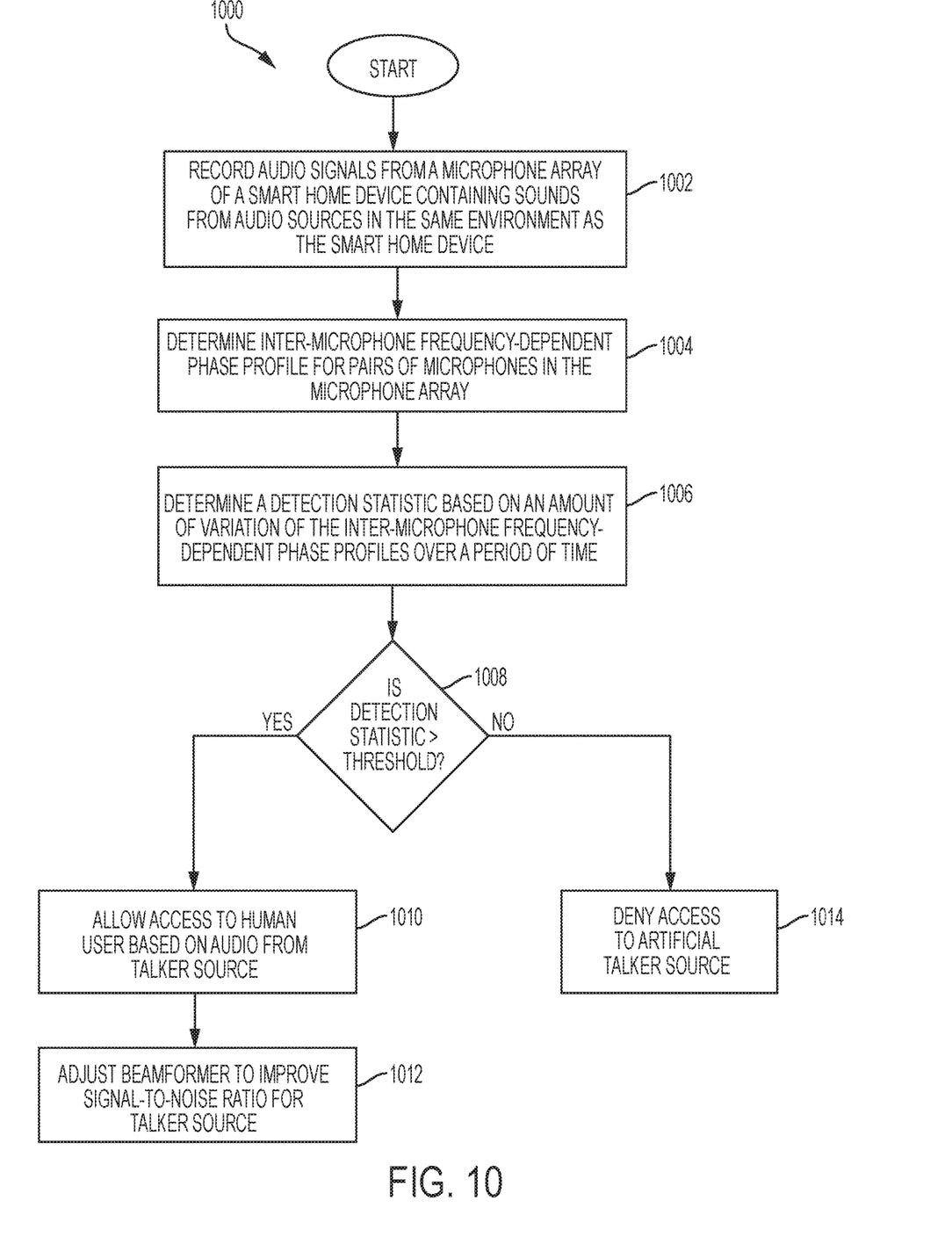
FIG. 10 is a flow chart illustrating an example method for authenticating a user with a detection statistic based on the changes or variation of the phase profile over time according to some embodiments of the disclosure.

Voice biometric authentication of a user may be improved by including spatial stationarity information for the classification of the audio source as a human talker or an artificial talker. One example authentication process is described with reference to FIG. 10. FIG. 10 is a flow chart illustrating an example method for authenticating a user with a detection statistic based on the changes or variation of the phase profile over time according to some embodiments of the disclosure. In some embodiments, the processing described in method 1000 is performed continuously by an integrated circuit (IC) on data received from a microphone array. In some embodiments, the processing of method 1000 is performed at periodic or non-periodic intervals. In some embodiments, the processing of method 1000 is performed upon the request of a user, such as by a user pressing a button on the smart home device.

A method 1000 begins at block 1002 with recording audio signals from a microphone array of a smart home device. The audio signals contain sounds from audio sources near or in the same environment as the smart home device. At block 1004, the inter-microphone frequency-dependent phase profile is determined for pairs of microphones in the microphone array. In some embodiments, a full band of the recorded audio signals is used to determine the phase profile. In some embodiments, selected sub-bands of the recorded audio signals, such as voice frequency bands, are used to determine the phase profile to reduce computational complexity or to reduce noise. At block 1006, a detection statistic is determined based on the amount of variation of the inter-microphone frequency-dependent phase profiles of block 1004 over a period of time. At block 1008, the detection statistic is compared to a threshold level. If the statistic is above the threshold, then the method 1000 continues to blocks 1010 and 1012 to control the smart home device, although other actions may be performed when voice authentication is successful and the type of action performed may vary based on the type of device. After allowing access to the human user, additional processing may be performed such as to adjust a beamformer to improve signal-to-noise ratio for the talker source at block 1012. Examples of this beamformer are described in the related applications incorporated by reference herein. Referring back to block 1008, if the statistic is not above the threshold, then the method 1000 continues to block 1014 to deny access to the artificial talker. For example, a voice command may be ignored when the voice command is determined to originate from an artificial talker. Furthermore, the smart home device may be temporarily locked upon receipt of such a voice command to prevent future spoofing attacks from the same artificial talker. In some embodiments, the spatial stationarity information of the audio source that is captured by the multi-microphone based detection statistic may be combined with other single-microphone spectral information based anti-spoofing methods for further enhancing the performance of the voice biometric authentication system.

In some embodiments, the determination that the source is a human talker may not be sufficient on its own to allow processing and execution of the voice command received from the human talker. At block 1010, the user may be authenticated based on audio recorded from the talker source. For example, a biometric identification of the user, who has been determined to be a human talker, may be performed to determine whether that particular human talker is authorized to access the smart home device. Speaker recognition may be performed by a user identification system, such as described in U.S. Pat. No. 9,042,867 to Marta Gomar issued on May 26, 2015 and entitled "System and Method for Speaker Recognition on Mobile Devices," which is incorporated by reference herein.

Additional processing may be performed to authenticate a user prior to further processing of the recorded audio signals. In some embodiments, the steps of determining an audio source is a human talker, and authenticating the human talker are performed locally on the smart home device. After a user is authenticated, privacy controls may be applied to restrict the transmission of audio content received from the audio source corresponding to the authenticated user. User privacy enforcement may be performed as described in U.S. patent application Ser. No. 15/669,607 to Seth Suppappola filed on Aug. 4, 2017 and entitled "Audio Privacy Based on User Identification," which is incorporated by reference herein.

Referring back to block 1008, in some embodiments, after a human talker is identified as an authorized user, voice commands may be received and processed from the audio source. At block 1012, audio processing may be configured to improve a signal-to-noise ratio (SNR) of the human talker. Additionally, spatial information may be used to control a beamformer receiving the microphone signals. This additional processing may be performed using spatial information, such as the calculated inter-microphone frequency-dependent phase profile, regarding the audio source. In some embodiments, spatial information regarding the audio sources may be used to adjust a beamformer to improve the SNR for the talker source. For example, other audio sources in the environment may be identified as interference sources, and noise from those interference sources reduced to improve a signal level of the talker source. Interference detection may be performed as described in U.S. patent application Ser. No. 15/714,190 to Narayan Kovvali et al. filed on Sep. 25, 2017 and entitled "Persistent Interference Detection," which is incorporated by reference herein.

In some embodiments, voice commands are received, processed locally, and actions performed locally. In some embodiments, voice commands processed after authentication are transmitted to a remote system, such as in the cloud. The cloud processes the voice commands, determines a request to be fulfilled, and performs actions to satisfy the request. For example, the request may be to turn on smart lighting devices and the actions to satisfy the request may be sending a wireless signal to the identified smart lighting device to turn on the device.

In some embodiments, the functionality described for detecting human vs. artificial audio sources may be based on other statistics in addition to the inter-microphone frequency-dependent phase profiles. For example, inter-microphone frequency-dependent magnitude profiles may be used for the audio source spatial stationarity detection statistic.

The schematic flow chart diagram of FIG. 5 and FIG. 10 is generally set forth as a logical flow chart diagram. Likewise, other operations for the circuitry are described without flow charts herein as sequences of ordered steps. The depicted order, labeled steps, and described operations are indicative of aspects of methods of the invention. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a processor may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Furthermore, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations. In some embodiments, the integrated circuit (IC) that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where general purpose processors are described as implementing certain processing steps, the general purpose processor may be a digital signal processors (DSPs), a graphics processing units (GPUs), a central processing units (CPUs), or other configurable logic circuitry. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for voice authentication using a microphone array, the method comprising:
    recording audio signals from at least a first microphone and a second microphone of the microphone array, wherein the recorded audio signals are generated by an audio source in the same environment as the microphone array;
    determining an amount of movement of the audio source with respect to the microphone array based on the recorded microphone signals over a period of time, wherein the amount of movement is for a movement of the audio source occurring during the recording of the audio signals; and
    determining whether the audio source is a human talker or an artificial talker based, at least in part, on the amount of movement of the audio source over the period of time corresponding to the recording of the audio signals.

2. The method of claim 1, wherein the step of determining whether the audio source is a human talker or an artificial talker comprises:
    determining the audio source is a human talker when the amount of movement of the audio source exceeds a threshold amount over a period of time; and
    determining the audio source is an artificial talker when the amount of movement of the audio source is less than a threshold amount over a period of time.

3. The method of claim 1, wherein the step of determining the amount of movement of the audio source based on the recorded microphone signals over a period of time comprises determining an inter-microphone frequency-dependent phase profile for at least the first microphone signal and the second microphone signal over a period of time, wherein the step of determining whether the audio source is a human talker or an artificial talker is based, at least in part, on the inter-microphone frequency-dependent phase profile over a period of time.

4. The method of claim 3, wherein the step of determining the amount of movement of the audio source based on the recorded microphone signals over a period of time comprises determining an inter-microphone frequency-dependent phase profile for a plurality of microphone signals received from a microphone array.

5. The method of claim 3, wherein the step of determining the amount of movement of the audio source based on the recorded microphone signals over a period of time comprises determining a detection statistic based on an amount of variation of the inter-microphone frequency-dependent phase profile over a period of time.

6. The method of claim 5, wherein the detection statistic is determined based, at least in part, on a set of frequency sub-bands of a full band of the audio signals.

7. The method of claim 5, wherein the step of determining whether the audio source is a human talker or an artificial talker comprises determining the audio source is a human talker when the detection statistic exceeds a threshold level, and determining the audio source is an artificial talker when the detection statistic is less than a threshold level.

8. The method of claim 1, further comprising, when the audio source is determined to be a human talker, determining an authorized user corresponding to the human talker.

9. The method of claim 8, wherein the step of determining an authorized user comprises performing voice biometric authentication to match the human talker to an enrolled user.

10. The method of claim 8, further comprising, receiving a voice command from the human talker and transmitting the voice command to a remote device for execution of the voice command.

11. The method of claim 1, further comprising, when the audio source is determined to be a human talker, using spatial information to reduce interference from noise sources in the recorded audio signals from the first microphone and the second microphone.

12. An apparatus, comprising:
    an integrated circuit (IC) configured to perform steps comprising:
        recording audio signals from at least a first microphone and a second microphone of the microphone array, wherein the recorded audio signals are generated by an audio source in proximity to or in the same environment as the microphone array;
        determining an amount of movement of the audio source with respect to the microphone array based on the recorded microphone signals over a period of time, wherein the amount of movement is for a movement of the audio source occurring during the recording of the audio signals; and
        determining whether the audio source is a human talker or an artificial talker based, at least in part, on the amount of movement of the audio source over the period of time corresponding to the recording of the audio signals.

13. The apparatus of claim 12, wherein the IC is configured to determine whether the audio source is a human talker or an artificial talker by:
    determining the audio source is a human talker when the amount of movement of the audio source exceeds a threshold amount over a period of time; and
    determining the audio source is an artificial talker when the amount of movement of the audio source is less than a threshold amount over a period of time.

14. The apparatus of claim 12, wherein the IC is configured to determine the amount of movement of the audio source based on the recorded microphone signals over a period of time by determining an inter-microphone frequency-dependent phase profile for at least the first microphone signal and the second microphone signal over a period of time, wherein the step of determining whether the audio source is a human talker or an artificial talker is based, at least in part, on the inter-microphone frequency-dependent phase profile over a period of time.

15. The apparatus of claim 14, wherein the IC is configured to determine the amount of movement of the audio source based on the recorded microphone signals over a period of time by determining a detection statistic based on an amount of variation of the inter-microphone frequency-dependent phase profile over a period of time.

16. The apparatus of claim 14, wherein the step of determining the amount of movement of the audio source based on the recorded microphone signals over a period of time comprises determining an inter-microphone frequency-dependent phase profile for a plurality of microphone signals received from a microphone array.

17. The apparatus of claim 16, wherein the detection statistic is determined based, at least in part, on a set of frequency sub-bands of a full band of the audio signals.

18. The apparatus of claim 16, wherein the IC is configured to determine whether the audio source is a human talker or an artificial talker comprises determining the audio source is a human talker when the detection statistic exceeds a threshold level, and determining the audio source is an artificial talker when the detection statistic is less than a threshold level.

19. The apparatus of claim 12, wherein the IC is further configured to, when the audio source is determined to be a human talker, determine an authorized user corresponding to the human talker.

20. The apparatus of claim 19, wherein the IC is configured to determine an authorized user by performing voice biometric authentication to match the human talker to an enrolled user.

21. The apparatus of claim 19, wherein the IC is further configured to receive a voice command from the human talker and transmit the voice command to a remote device for execution of the voice command.

22. The apparatus of claim 12, wherein the IC is further configured to use spatial information to reduce interference from noise sources in the recorded audio signals from the first microphone and the second microphone.

* * * * *

UNITED STATES PATENT AND TRADEMARK OFFICE
CERTIFICATE OF CORRECTION

PATENT NO. : 10,733,276 B2
APPLICATION NO. : 15/836677
DATED : August 4, 2020
INVENTOR(S) : Kovvali et al.

It is certified that error appears in the above-identified patent and that said Letters Patent is hereby corrected as shown below:

In the Specification

In Column 2, Line 37, delete "or" and insert -- or an --, therefor.

In Column 6, Line 22, delete "based the" and insert -- based on the --, therefor.

In Column 7, Line 25, delete "paths" and insert -- path --, therefor.

In Column 7, Line 28, delete "paths" and insert -- path --, therefor.

In Column 7, Line 30, delete "path 608" and insert -- path 608A --, therefor.

In Column 7, Line 31, delete "paths" and insert -- path --, therefor.

In Column 9, Line 34, delete "reduced" and insert -- is reduced --, therefor.

In Column 10, Line 54, delete "includes" and insert -- include --, therefor.

In Column 10, Line 55, delete "(CD)," and insert -- (CDs), --, therefor.

In Column 10, Line 56, delete "(DVD)," and insert -- (DVDs), --, therefor.

Signed and Sealed this
Second Day of August, 2022

Katherine Kelly Vidal
*Director of the United States Patent and Trademark Office*